No. 630,942. Patented Aug. 15, 1899.
J. H. SNOW.
SCOOP SCALE.
(Application filed Apr. 28, 1898.)

(No Model.) 3 Sheets—Sheet 1.

WITNESSES:
S. E. Snow.
C. Chambers.

INVENTOR
Jacob H. Snow.

No. 630,942. Patented Aug. 15, 1899.
J. H. SNOW.
SCOOP SCALE.
(Application filed Apr. 28, 1898.)

(No Model.) 3 Sheets—Sheet 3.

WITNESSES: L. E. Snow. C. Chambers.

INVENTOR Jacob H. Snow.

THE NORRIS PETERS CO., PHOTO-LITHO., WASHINGTON, D. C.

UNITED STATES PATENT OFFICE.

JACOB H. SNOW, OF INDIANAPOLIS, INDIANA.

SCOOP-SCALE.

SPECIFICATION forming part of Letters Patent No. 630,942, dated August 15, 1899.

Application filed April 28, 1898. Serial No. 679,133. (No model.)

*To all whom it may concern:*

Be it known that I, JACOB H. SNOW, a citizen of the United States, residing at Indianapolis, in the county of Marion and State of Indiana, have invented a new and useful Improvement in Scoop-Scales, as set forth in the annexed specification.

My invention relates to improvements in scoop-scales; and the object of the invention is to provide a scoop-scale with which any article scooped by the common scoop now in use can be scooped and weighed in the scoop.

Figure 1:
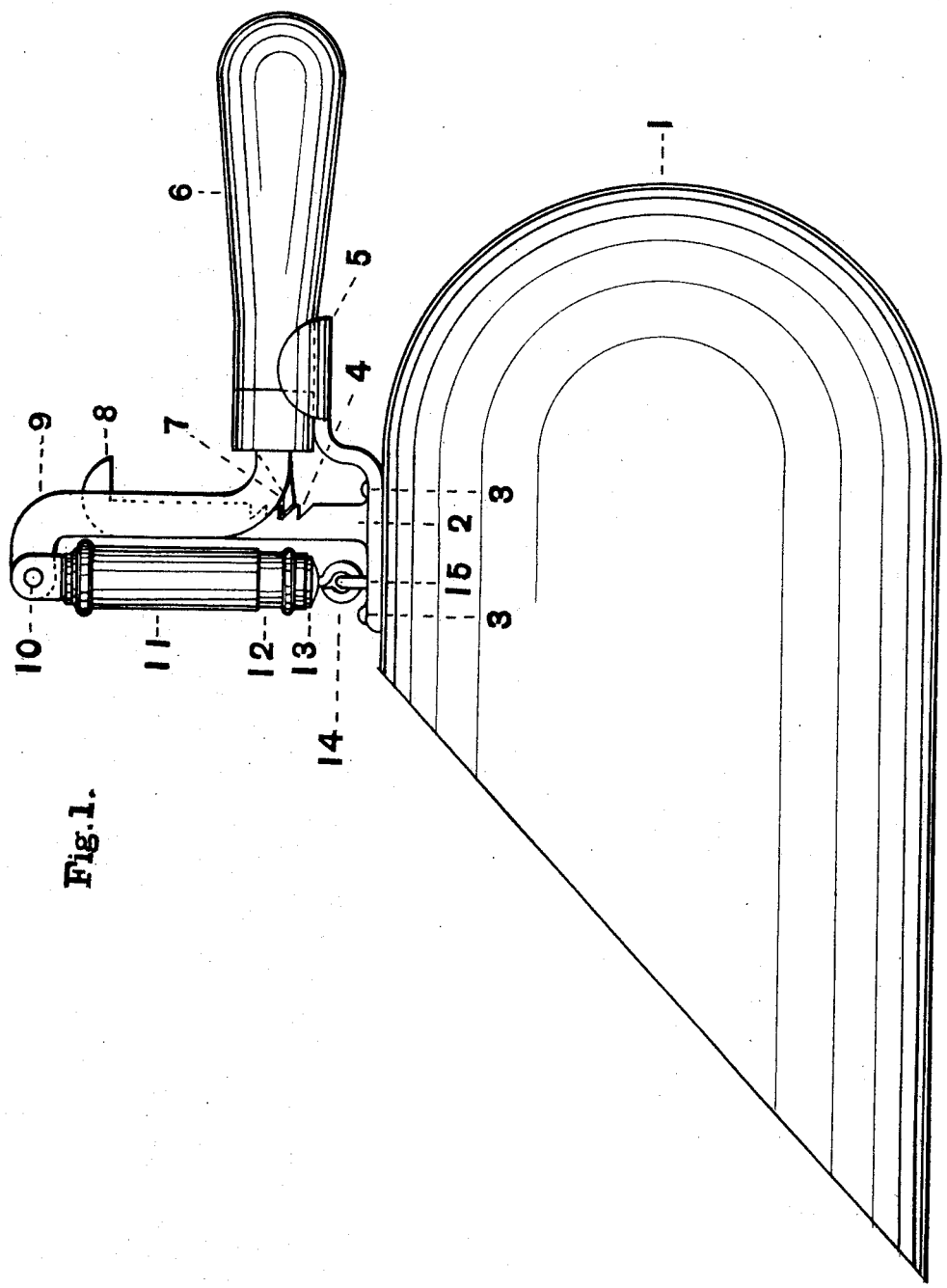
Figure 2:
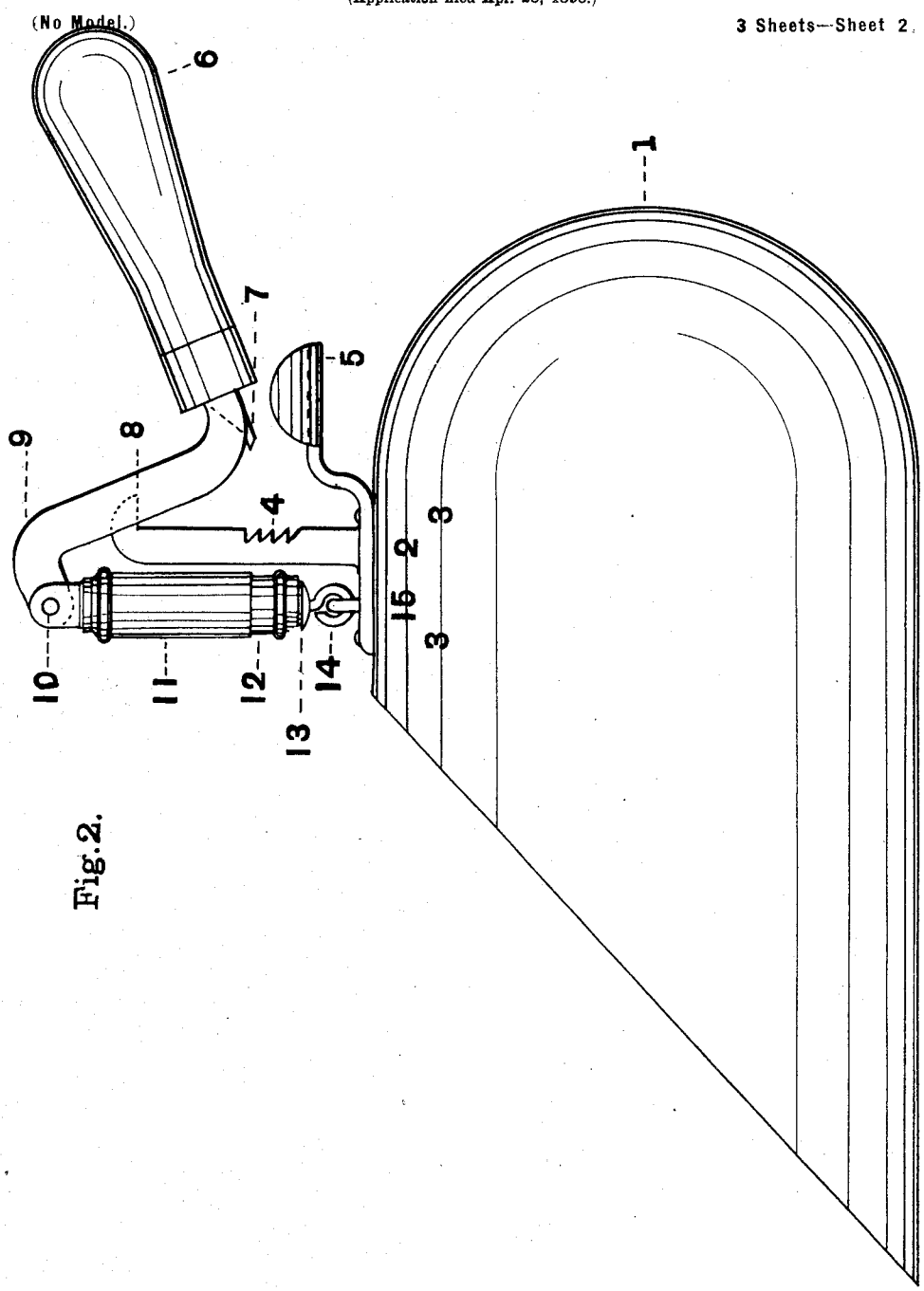
Figure 3:
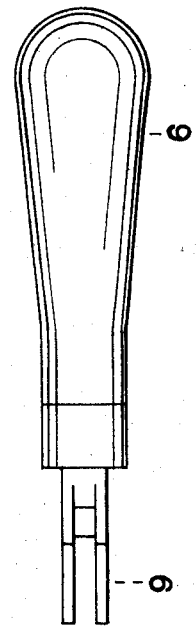
Figure 4:
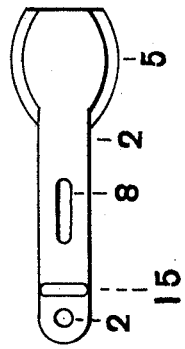
Figure 6:
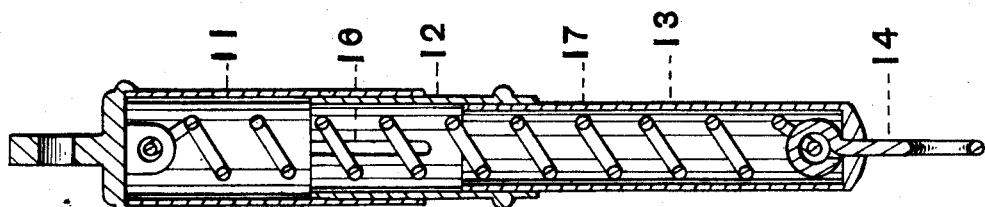
Figure 5:
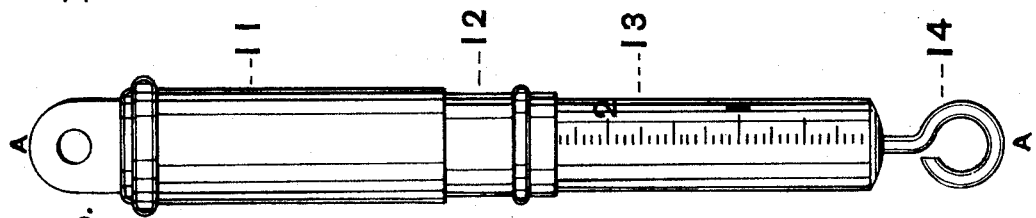

In the drawings, Figure 1 is a side view of the scoop-scale in the position to be used as a scoop. Fig. 2 is a side view of the scoop-scale in the weighing position. Fig. 3 is a top view of the handle disconnected from the scoop. Fig. 4 is a top view of the finger-piece and guide. Fig. 5 is an enlarged side view of the scale disconnected from the scoop. Fig. 6 is a side sectional view of the scale taken on the line A A in Fig. 5.

Similar numerals of reference indicate corresponding parts in all the figures of the drawings.

1 designates the scoop, similar to the common scoop now in use.

2 designates a connection between the scoop and scale.

3 designates rivets which hold the connection 2 to the scoop.

4 designates notches in the upright piece.

5 designates a finger-piece which fits under the handle.

6 designates the handle.

7 designates a tooth that fits in the notches 4 when the handle is in a position to be used as a scoop.

8 designates a hook on the top of the connection 2, projecting toward the handle and adapted to fit between the forks of the handle and act as a guide to prevent the turning of the scoop while in a weighing position.

9 designates the forks of the handle adapted to work on either side of the hook 8.

10 designates a rivet that holds the forks of the handle to the scale.

11 designates the cover of the scale.

12 designates a slide that fits inside of the top cover of the scale and is used to adjust the scale when out of adjustment by sliding up or down in the cover 11.

13 designates the lower half of the scale, which slides loosely inside of the cover 11 and 12.

14 designates a double hook at the lower end of the scale, the inner end of which connects with the spring 17 and the outer end connects with the projection 15 on the connector 2.

15 designates a projection on the connector 2 through which passes the hook 14.

16 designates a slot cut in the slide 12, so it can be sprung out to make it fit snug inside of the cover 11.

17 designates the spring connected at the top and bottom of the scale.

The operation of the scoop-scale is as follows: The handle is placed in the position shown in Fig. 1 and the first finger is placed under the finger-piece, (marked 5,) which is held firm against the handle until the scoop is filled, and then the first finger is released and the finger-piece 5 drops down and the handle is moved back until the hook 8 is removed from the notches 4 and the handle swings into the position shown in Fig. 2, and the scoop is then suspended by the scale, which is held at the top by the forks of the handle 9, being secured to the top of the scale by the rivet 10, and the scale is then drawn down by the weight in the scoop, as shown in the detail views Figs. 5 and 6. When the scoop is empty, the scale is adjusted by moving the slide 12 up or down, so the bottom of the slide is on a line with the first mark on the scale when there is nothing in the scoop.

Having thus described my invention, what I claim, and desire to secure by Letters Patent, is—

1. The combination in a scoop-scale of the scoop 1, the connector 2, the finger-piece 5, the handle 6, scales interposed between and pivotally connected to the scooped handle the hook 7, the notches 4, the hook 8, and the forks 9, substantially as shown and described.

2. The combination in a scoop-scale of the scoop 1, having secured thereto the upright 2, the rivets 3, the notch 4, the finger-piece 5, the handle 6, the hook 7, the hook 8, the forked handle 9, secured to the top of the scale 11, by the rivet 10, the scale 11, having the adjustable slide 12 and the indicator 13, the hook 14 hooked into the projection 15, substantially as shown and described.

3. The combination with a scoop and handle, of spring-scales pivotally connecting the two, a hook extending from the scoop into a portion of the handle and serving as a guide to prevent the scoop from turning, and means for locking the handle to the scoop whereby the handle and scoop are rigidly held together.

In testimony that I claim the foregoing as my own I have hereunto affixed my signature in the presence of two witnesses.

JACOB H. SNOW.

Witnesses:
    JESSE D. HANNICK.
    L. E. SNOW.